Aug. 10, 1926.

M. R. BRUNER

1,595,447

TRACTOR IMPLEMENT

Filed Jan. 8, 1925

M. R. BRUNER 1,595,447

TRACTOR IMPLEMENT

Filed Jan. 8, 1925    8 Sheets-Sheet 8

Martin R. Bruner, INVENTOR,

BY E. G. Siggers

ATTORNEY

WITNESSES

Howard D. Orr
E. N. Lovewell

Patented Aug. 10, 1926.

1,595,447

UNITED STATES PATENT OFFICE.

MARTIN R. BRUNER, OF BUCKLAND, OHIO.

TRACTOR IMPLEMENT.

Application filed January 8, 1925. Serial No. 1,244.

This invention relates to a tractor implement, driven preferably by an explosive engine, and especially adapted to be used in conducting farm operations on a comparatively large scale. The specific form of the invention herein disclosed is used for plowing, but it will be obvious that many of the salient features thereof may be used in connection with implements designed for other purposes.

One of the principal objects of the invention is to provide, in a machine of this type, improved means for guiding or positioning the same, so as to perform the required work in the most efficient manner. In connection therewith, I have provided improved driving mechanism and improved means for supporting the engine in cooperative relation therewith, so that all parts operate in unison to effect the desired result in the most expeditious manner. Special means are provided for swinging the rear end of the frame laterally about either one of the front wheels as a center, so as to immediately compensate for any displacement which may result from turning a corner. The bull wheel and land side wheel, which are located at the front end of the machine, perform the function of steering wheels, and the engine is supported to swing therewith, while at the same time maintaining an operative position with respect to the rear wheel.

The main traction or bull wheel is so constructed that the resultant tractive force is exerted at all times in a direction substantially opposite to the resistance of the work performed, whereby the side draft is neutralized.

The invention also includes improved means for supporting the plows, for adjusting the depth thereof, and for rendering the same inoperative when moving from one field to another.

The invention consists further in numerous novel features and combinations thereof, which will be more fully explained in connection with the accompanying drawings, which illustrate the preferred form of the invention.

In the drawings:—

Figure 2 is a plan view of the invention, the bull wheel being shown in section.

Figure 5:
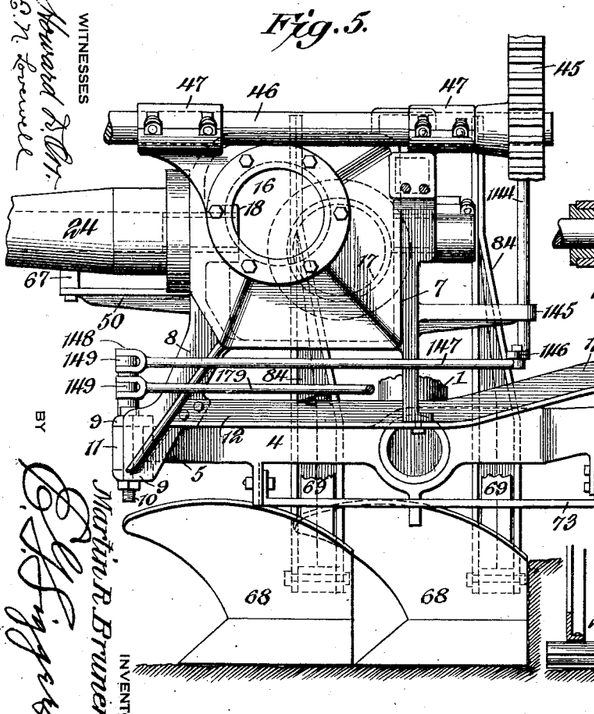
Figure 5 is a front elevation of the main frame with the engine mounted thereon.

My invention, in its present embodiment, includes a main frame having a central longitudinal member 1, which may be called the backbone of the machine and is preferably tubular and of comparatively large diameter, so as to secure the maximum rigidity to resist lateral and torsional strains. Welded or otherwise rigidly secured to the rear end of this backbone is a horizontally disposed ring 2, which is supported by a rear wheel 3, in a manner hereinafter more particularly explained. Secured to the front end of the backbone 1, in a similar manner, is a strong and rugged transverse beam 4, having forwardly and outwardly extending end portions 5 and 6 forming a substantial support for the engine block 7. The latter is provided at one side with a downwardly and laterally inclined leg 8, as shown in Figure 5, which terminates in opposed perforated ears 9 for receiving a pivot bolt 10, which passes through an eye 11 formed in the end of the arm 5, and constituting a pivotal connection between the engine block and the yoke 4. Extending from the opposite side of the engine block and rigidly secured thereto is a supporting bar 12, having a roller 13 mounted on its outer end, and adapted to ride upon an arcuate track 14, rigidly secured to the arm 6 and described about the pivot bolt 10 as a center. Secured to the upper side of the track 14 is a keeper 15, beneath which the roller 13 is guided.

Figure 6:
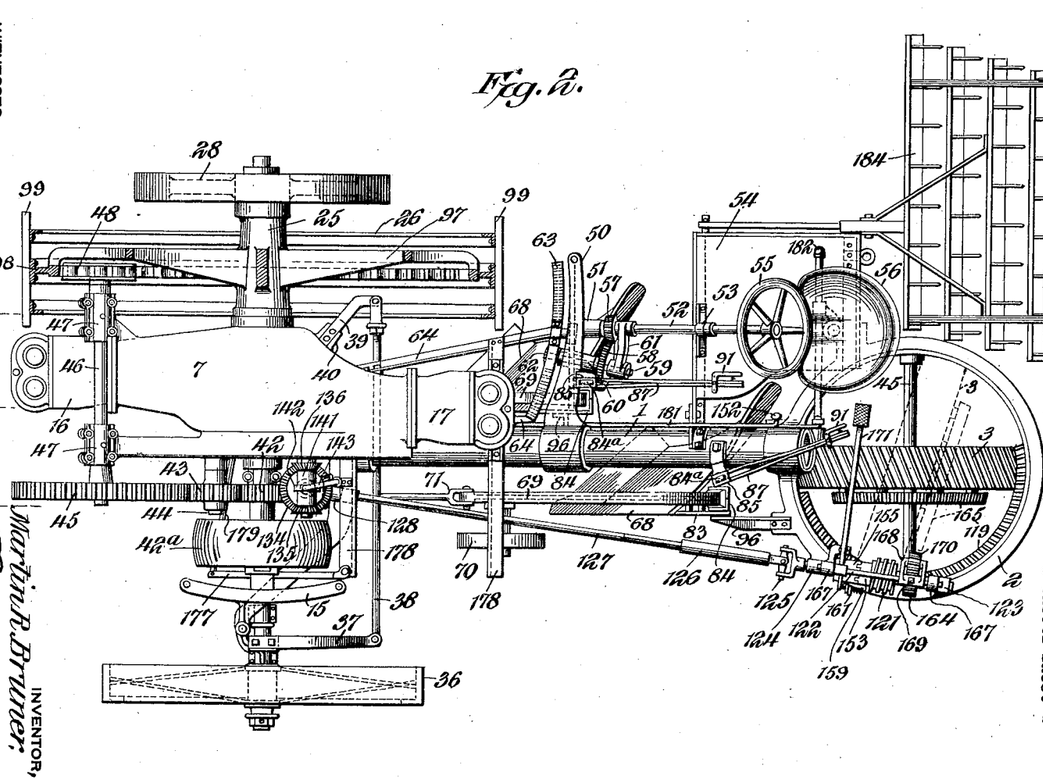
Figure 6 is a vertical section through the engine casting, showing also the colter disks and trash feeders.

The engine herein shown has two cylinders 16 and 17 secured to its front and rear ends respectively, and bearings 18 and 19 are provided within the engine casing 7, as shown in Figure 6, and lined with bushings 20 and 21 respectively, for supporting a crank shaft 22. The latter is provided with two cranks 23, suitably located for cooperation with the cylinders 16 and 17. The engine casing 7 is extended at one side in the form of an axle 24, on which is journaled the hub 25 of the main traction or bull wheel 26. A bushing 27 is also provided within the end of the axle 24 to provide additional bearing for the crank shaft 22 which extends through and beyond the hub 25, where it is provided with a fly wheel 28, as seen in Figure 2.

Figures 4, 19:
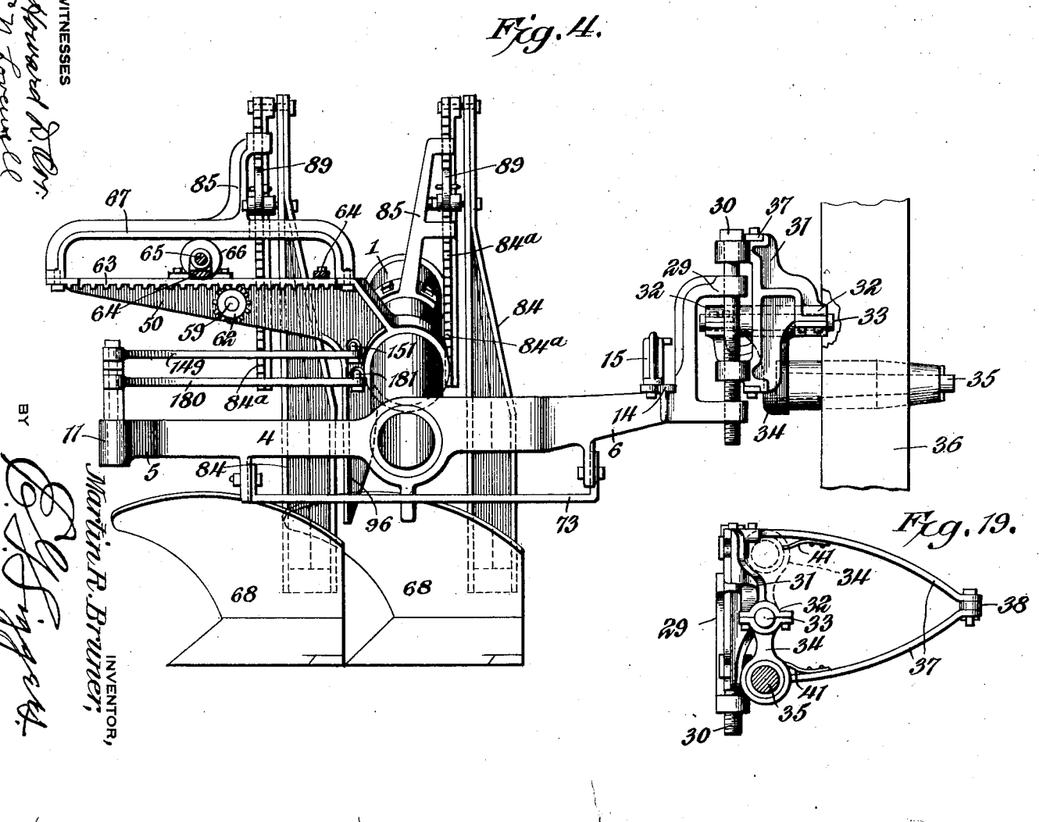
Figure 4 is a front elevation of the main frame and steering gear, showing the connection of the latter to the rear portion of the engine frame, which is shown in section.
Figure 19 is a detail view of the means for adjusting the land side wheel for transporting the implement from one field to another.

The arm 6 terminates outwardly of the track 14 in a yoke 29, as shown in Figure 4, for receiving a vertical bolt 30, which has a threaded connection with the lower arm of the yoke, so that it may be adjusted vertically therein. The bolt 30 is supported in a bracket 31, and has a bearing 32 within which is journaled a stud 33 formed on the end of a link 34, which is provided at its other end with a laterally extending spindle 35, forming an axle for the land side wheel 36.

Secured to and extending rearwardly from the bracket 31 is a yoke 37, which is pivotally connected to one end of a rod 38, the other end of the rod being pivotally connected to an arm 39 which is rigidly secured to a seat 40, formed on the engine casing, and extends rearwardly therefrom.

It may here be noted that when the engine casing 7 is swung about the pivot bolt 10, with the roller 13 riding upon the track 14, the bull wheel 26 is swung in unison therewith about the same center, and by means of the rod 38 the land side wheel 36 is also swung through the same angle, and maintained in parallelism with the bull wheel.

It may also be noted that the land side wheel 36 is of smaller diameter than the bull wheel 26, and is adapted to ride upon the unplowed land, while the bull wheel rides in the dead furrow. By means of the bolt 30, the land side wheel 36 may be raised or lowered to correspond with the depth of the furrow, so that the axes of the wheels may be maintained in horizontal positions. The link 34 is adapted to be swung about the stud 33 as a center, between the position shown in full lines in Figure 19 and the position shown in dotted lines, and will be normally held in either of these extreme positions by means of the respective spring catches 41, secured to the arms of the yoke 37. When the link 34 and the spindle 35 are in the uppermost or dotted line position, the land side wheel 36 is in position for plowing, and when swung to their lowermost or full line position, the land side wheel is in position for traveling over the road.

When the engine casing 7 is swung laterally about the pivot bolt 10 as above described, the bull wheel 26 and land side wheel 36 are also swung laterally, and serve as a steering means for the machine when the latter is traveling forwardly, and the engine at the same time, together with the mechanism for propelling the machine forwardly, maintains its operative relation to the bull wheel which constitutes the main drive wheel, as well as the steering wheel. This driving mechanism includes a pinion 42 mounted on the crank shaft 22 outside of the engine casing 7, and adapted to be operatively connected to the crank shaft by means of a reversing clutch pulley 42$^a$ of the usual construction. The pinion 42 is in mesh with an idler gear 43, mounted on a stud 44 which is secured to the engine casing. The idler 43 in turn drives a gear wheel 45, which is secured to one end of a countershaft 46, journaled in suitable bearings 47 which are secured to the engine casing. The opposite end of the shaft 46 has a roller gear 48 secured thereto, which meshes with the internal gear 49, formed on the inside of the rim of the bull wheel 26.

A laterally projecting arm 50 is rigidly secured to the backbone 1, and serves as a support for the steering gear mechanism. Formed on the rear side of the arm 50 is a socket 51, which provides a support for the lower end of a steering column 52, which extends upwardly and rearwardly and is rotatably mounted in bearings 53 secured to the front side of a platform 54. The upper end of the steering column 52 is provided with a steering wheel 55, conveniently located in front of the driver's seat 56, which is supported by the platform 54. A pinion 57, secured to the lower end of the steering column 52, meshes with a gear 58 secured to a countershaft 59, which is journaled in a suitable bearing 60 formed on the arm 50, the rear end of the shaft 59 being suitably braced from the steering column 52 by a link 61. The shaft 59 extends forwardly through the bar 50, and is provided at its forward end with a bevel pinion 62, which is in mesh with an arcuate rack bar 63, rigidly secured by a framework 64 to the engine casing 7, and concentric with the pivot bolt 10. A stud 65 extends rearwardly beyond the rack bar 63, Figures 2 and 4 and is provided with a roller 66, which is guided beneath a keeper 67 secured to the upper side of the arm 50, so as to maintain the rack bar always in mesh with the pinion 62, and also to serve as additional means to prevent displacement of the engine.

Figure 1:
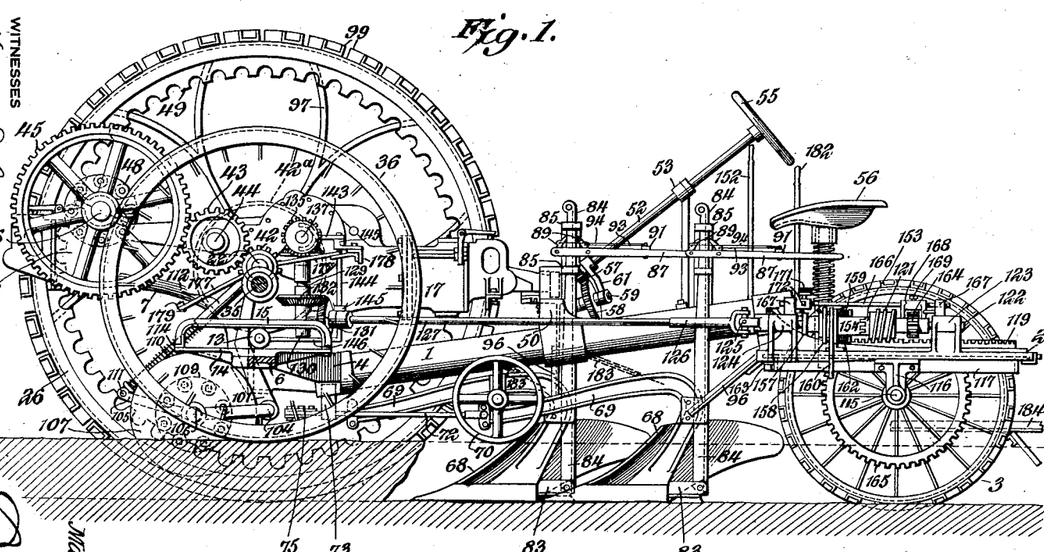
Figure 1 is a side elevation of the invention, with parts broken away in order to show more clearly the operative mechanism.
Figure 3:
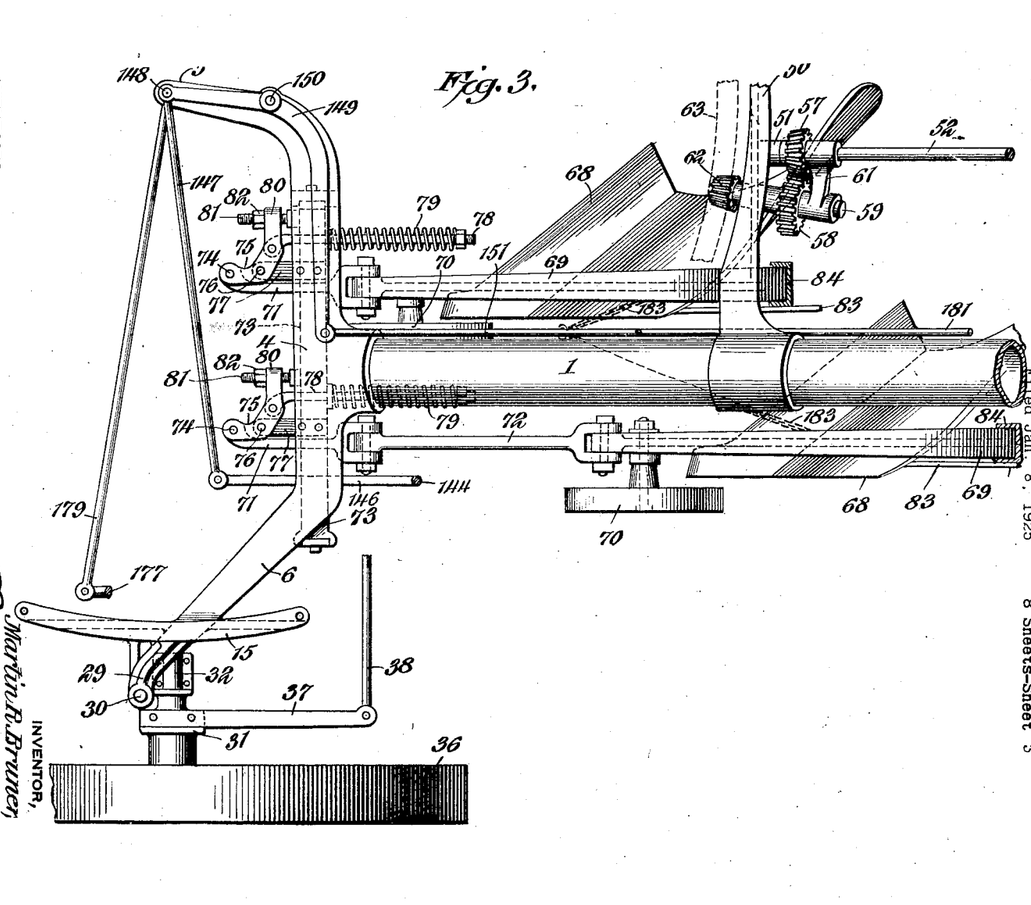
Figure 3 is a plan view of the front portion of the main frame and certain operative parts associated therewith.

The frame of the machine is adapted to support a plurality of plows 68, two being shown in the present instance. Each plow is secured in the usual manner to a beam 69, which is provided at its forward end with a gage wheel 70, and is pulled forwardly by means of a draw bar 71, pivotally connected to its front end. The second plow, as best shown in Figure 3, is provided with an extension link 72 between the beam and draw bar, so that it will trail behind the first plow. The draw bars 71 are guided in a keeper 73 secured to the under side of the bar 4, and each draw bar is pivotally connected at its forward end, as at 74, to one end of a bell crank 75, which is intermediately fulcrumed, as at 76, on a bracket arm 77 secured to and projecting forwardly from the bar 4. A rod 78 is pivotally connected to the bell crank 75 on the opposite side of its fulcrum and extends rearwardly, being surrounded by an expansile coiled spring 79, which normally holds the draw bar 71 in its foremost position, but is adapted to yield when the plow encounters an obstruction. The bell crank 75 is extended beyond its pivotal connection with the rod 78 and provided with an eye 80, which is received by a stud bolt 81 secured to and extending forwardly from the bar 4, and provided with a nut 82 forming an adjustable stop, which positively limits the rearward movement of the draw bar.

For adjustably supporting the plows at the required depth, the shoe of each plow has secured thereto a rearwardly projecting arm 83, which is pivotally connected to the lower end of a supporting standard 84. Pivotally connected to the upper end of the standard 84 is a downwardly extending bar 84$^a$, (Figures 1, 4, 17 and 18) which is guided for vertical movement in a keeper 85 secured to the main frame, and is provided on its front and rear faces with ratchet teeth 86. An adjusting lever 87 pivotally mounted, as at 88, on the keeper 85 is provided with opposed pawls 89 engageable with the respective teeth 86, and normally urged into engagement therewith by springs 90, whereby, when the lever 87 is rocked back and forth on its pivot 88, the pawls alternately engage successive ratchet teeth and raise the bar 84$^a$ and standard 84 step by step, and correspondingly elevate the plows. For releasing the bar 84$^a$ to lower the plows, a thumb lever 91 is pivoted at 92 to the handle of the lever 87, and connected by links 93 and 94 at opposite sides of the pivot 92 with the respective pawls 89. A spring 95, underneath the thumb lever 91, holds the latter normally in position to permit the pawls to engage the teeth 86, but upon depression of the thumb lever, the pawls are moved in opposite directions to disengage the ratchet teeth and permit the bar 84$^a$ to be lowered. It will be noted that there is sufficient lost motion between the pawls 89 and the links 93 and 94 to permit the pawls to function in raising the plows, while the thumb lever 91 remains in normal position.

Figure 7:
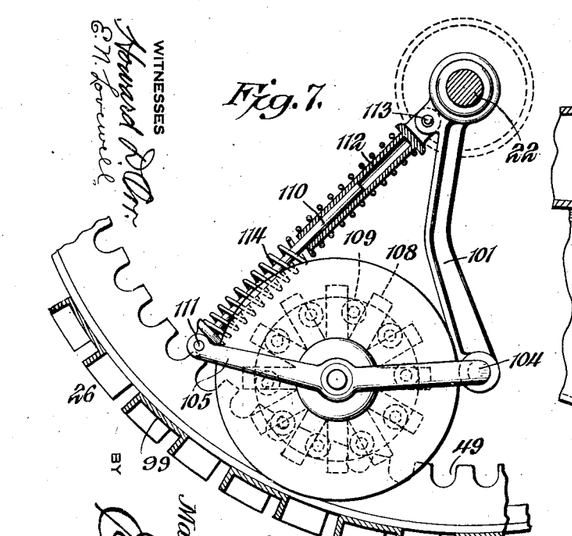
Figure 7 is a detail view, partly in section, showing the roller gear drive for the trash feeders.
Figures 8, 10:
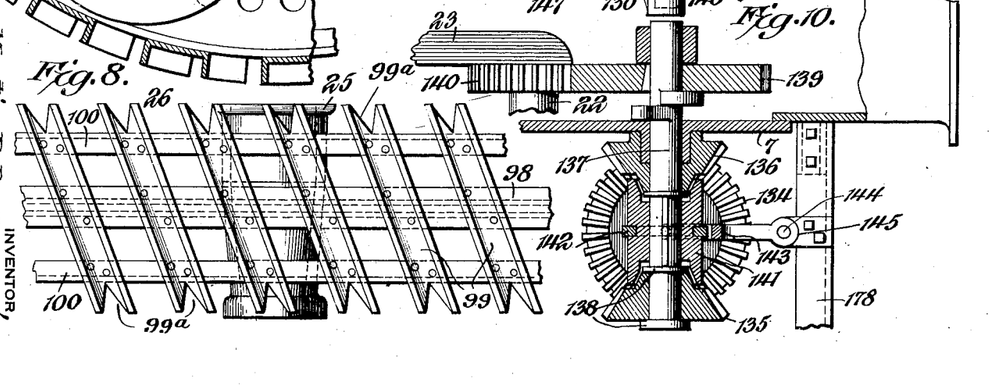
Figure 8 is a detail plan view of a portion of the bull wheel.
Figure 10 is a sectional detail view taken at right angles to the plane of Figure 9.

In order to prevent sidewise movement of the plows, due to the lateral pressure against the mold board, an abutment 96 is provided for each plow beam, and is secured to a suitable part of the main frame. The traction or bull wheel 26 is so constructed as to substantially neutralize the side draft resulting from the action of the plows. As heretofore stated, the hub 25 of the bull wheels is journaled on the trunnion 24. The spokes 97, extending from this hub, are curved or dished, as shown in Figure 2, so as to clear the roller gear 48. The rim 98 is secured to the outer ends of the spokes, and has secured to its outer face a series of traction lugs 99, which, as shown in Figures 7 and 8, are channel shaped in cross section, and inclined in a direction substantially perpendicular to the resultant of the forces acting upon the plows. The ends of the lugs 99, which are supported by supplemental rims 100, project beyond the side of the furrow and are cut out as at 99$^a$, forming two blades which cut into the land side, thus increasing the traction without adding to the weight.

Hanger bars 101 (Figures 6 and 7) are supported in front of the plows at opposite sides of the engine casing 7, one of these bars being pivotally supported on the outer surface of the bearing 19, and the other being pivotally supported on an annular flange 102, which surrounds the trunnion 24, and overhangs the inner end of the hub 25. The lower ends of these hanger bars are provided with bearings 103 in which is journaled a yoke 104, having forwardly projecting arms 105. A shaft 106, journaled in these arms, carries colter disks 107 and trash feeder wheels 108. The shaft 106, at one end, is provided with a roller gear 109, normally in mesh with the internal gear 49, and so proportioned that the colter disks and trash feeders will be rotated slightly faster than the forward movement of the machine. The arms 105 have rods 110 pivoted, as at 111, to their outer ends, which rods are telescopically connected to sleeves 112, pivotally mounted at 113 on the hubs of the hanger arms 101. Expansile coiled springs 114 surround the rods 110 and sleeves 112, and hold the gear 109 normally in mesh with the internal gear 49, so as to positively rotate the shaft 106, and cause loose stalks and other trash to be fed to the colter disks 107, and severed thereby. The springs 104, however, are adapted to yield and to permit the roller gear 109 to be thrown out of mesh in case the trash feeders meet with any unusual obstruction.

Figure 9:
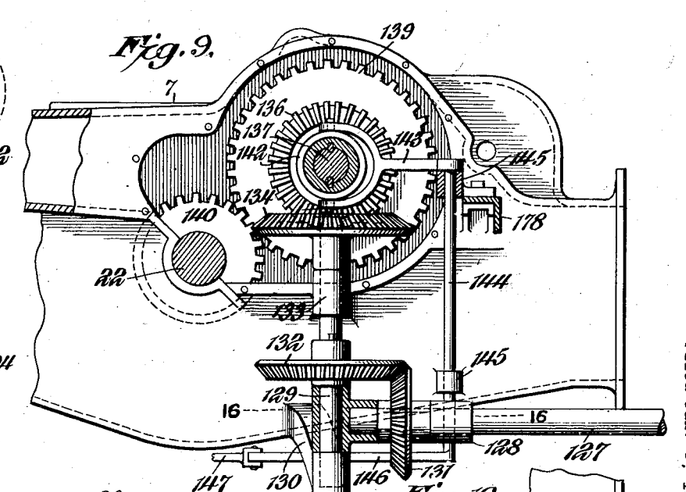
Figure 9 is a detail sectional view showing the reversing clutch and gear connections for the rear wheel.
Figures 13, 14, 15, 16, 17, 18:
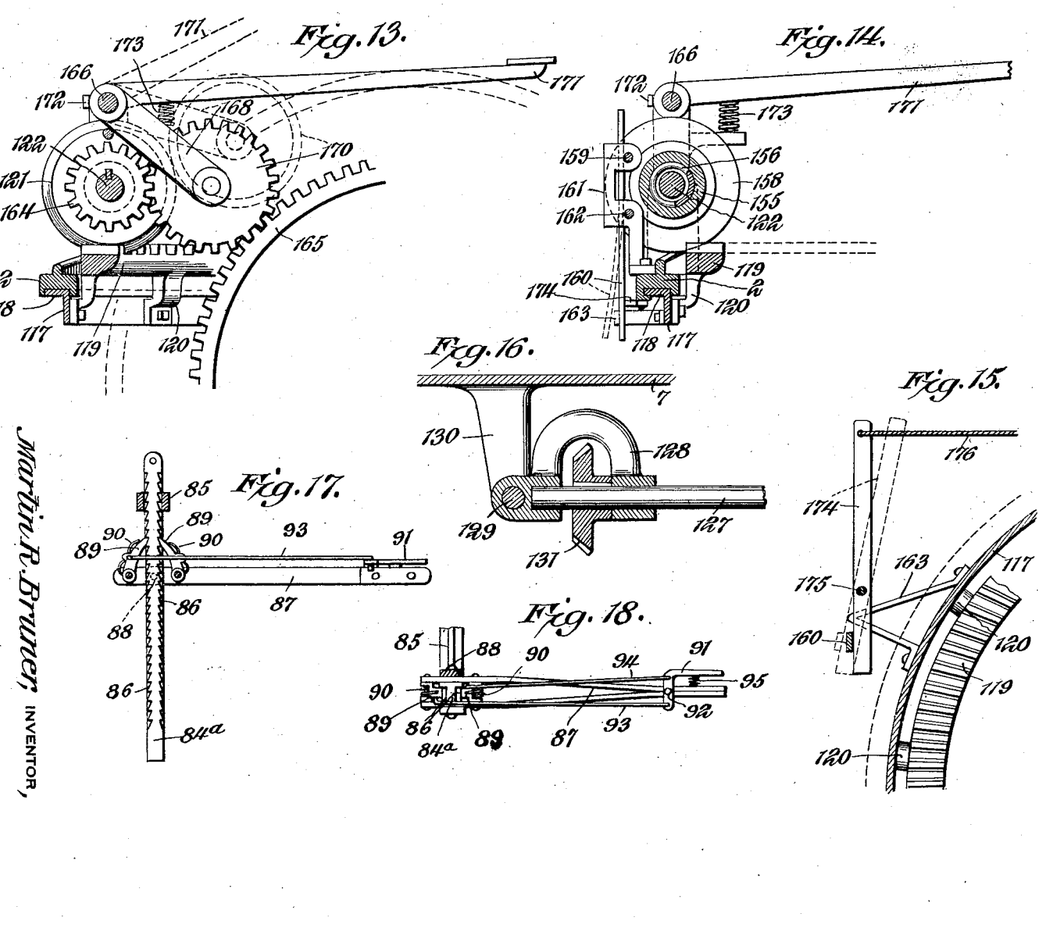
Figure 13 is a detail view of the driving gear connections for the rear wheel.
Figure 14 is a detail view of the manually operated means for releasing the clutch to restore the rear wheel to its normal position for forward travel.
Figure 15 is a detail sectional view taken at right angles to Figure 14.
Figure 16 is a detail view taken on the line 16—16 of Figure 9.
Figure 17 is a detail view in side elevation of the means for adjusting the depths of the plows.
Figure 18 is a plan view of the same.

As hereinbefore mentioned, the ring 2 at the rear end of the main frame is supported by the rear wheel 3. The latter is secured to an axle 115, the ends of which are journaled in bearing brackets 116, (Figures 1 and 11) secured to and depending from a ring 117, slidably mounted in a channel 118 (Figure 13) formed on the under side of the ring 2. A semi-circular worm gear 119 is secured to the inner side of the ring 117 by means of lugs 120. In mesh with the worm gear 119 is a worm 121 carried by a shaft 122, which is journaled in bearings 123 and 124 formed at one side of the ring 2. The worm 121 is rotatably mounted on the shaft 122, and is normally compelled to rotate with the shaft by means hereinafter described. Secured to the front end of the shaft 122 is a gimbal joint 125, connnected to a sleeve 126 within which is splined a telescopic extension 127, the forward end of which is mounted in a U-shaped bearing member 128 (Figures 9 and 16). This bearing member is journaled on a vertical shaft 129, which is rotatably supported at its lower end in a socket 130 formed on the engine casing 7. Thus, the angular relation between the shaft 128 and the engine casing is permitted to adjust itself when the latter is swung laterally with the bull wheel in steering the machine. A bevel gear 131 is secured to the forward end of the shaft 127 between the arms of the bearing member 128, and is adapted to be driven by a bevel gear 132 secured to the vertical shaft 129. The upper end of the shaft 129 is journaled in a bearing 133 formed on the side of the engine casing, and secured to the upper extremity of the shaft is a bevel gear 134, which is in constant mesh with two opposed bevel gears 135 and 136, (Figure 10) which are rotatably mounted on a horizontal shaft 137, but held against movement longitudinally of the shaft by suitable collars 138, or the like. The shaft 137 extends through the side of the engine casing 7 in which it is journaled, and has a spur gear 139 secured to its inner end, and driven by a pinion 140 secured to the crank shaft 22, inside the crank case. A reversible clutch member 141 is splined to the shaft 137 between the bevel gears 135 and 136, and is formed with oppositely disposed clutch faces, which, upon movement of the clutch member in one direction or the other, may cause either one of the gears 135 or 136 to be driven, thus driving the bevel gear 134 in either direction desired, and consequently by the train of mechanism above described, driving the worm 121 in either direction to turn the rear wheel 3. For shifting the clutch member 141, the latter is provided with a ring 142 to which a yoke 143 is pivotally connected. This yoke is secured to the upper end of a rock shaft 144, which is journaled in bearings 145 secured to the engine casing, and has at its lower end a laterally projecting arm 146, which is pivotally connected at its outer end to a link 147. This link, as shown in Figures 3 and 5, has its outer end pivotally connected at 148 to the forwardly projecting arm of a bell crank 149, which is intermediately fulcrumed at 150 to the main frame bar 4. The opposite end of the bell crank 149 is pivotally connected to a pull rod 151, which extends rearwardly, and is connected to a hand lever 152 mounted on the frame within convenient reach of the driver on the seat 56. By the manipulation of the lever 152, therefore, it will be seen that the bell crank 149 may be rocked about its fulcrum to move the link 147 longitudinally, and thereby rock the shaft 144, causing the clutch member 141 to engage and drive either one of the bevel gears 135, 136, and swing the rear wheel 3 in either direction. It will be noted that the pivot 148 is normally in substantial alinement with the pivot bolt 10 about which the engine and bull wheel swing, so that the operation of steering the machine forwardly will not affect the position of the clutch member 141.

Figures 11, 12:
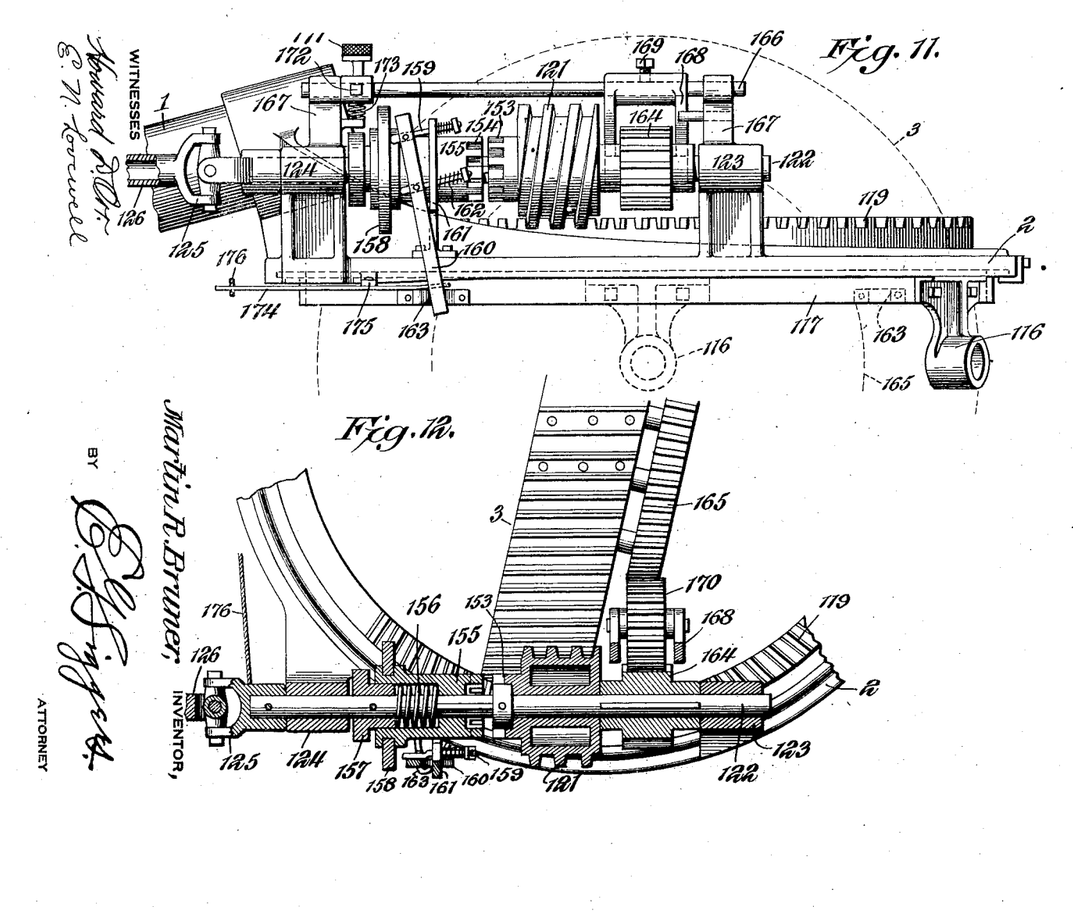
Figure 11 is a detail view in side elevation of the clutch and worm gear connection for swinging the rear wheel about a vertical axis.
Figure 12 is a horizontal sectional view of the same.

As stated above, the worm 121 is rotatably mounted on the shaft 122. The worm, however, is provided with a hub having clutch teeth 153 (Figures 11 and 12) which are adapted to be normally engaged by complementary clutch teeth 154 formed on a sleeve 155, which is splined to the shaft. The outer end of the clutch sleeve 155 is formed with a socket, which receives an expansile coiled spring 156 acting between the sleeve and a collar 157 secured to the shaft, and normally urging the clutch teeth into engagement. Secured to and surrounding the clutch sleeve 155 is a ring 158, adjacent to which are two pins 159 having a trip arm 160 secured thereto in depending relation. The pins 159 extend through a supporting bracket 161, secured to and upstanding from the ring 2 and coiled springs 162 surrounding the pins, hold the trip arm 160 normally against the side of the bracket. Two abutments 163 are secured to the ring 117 at opposite sides thereof, in such a position that when the ring 117 and wheel 3 have been swung through an arc of approximately 90° in either direction, the trip arm 160 will be engaged by one or the other of the abutments and tilted so as to force the ring 158 away from the worm 121, and disengage the clutch teeth 153 and 154, as shown in Figure 11.

When the clutch 141 has been shifted as above described, the engine is connected directly to the worm gear 119 until the rear wheel 3 assumes a position substantially tangent to a circle struck about the ground engaging portion of the bull wheel 26, or the land side wheel 36 as the case may be, and at this point the clutch sleeve 155 is automatically disconnected from the worm 121. It is then desirable to connect the wheel 3 to the engine, so that the rear end of the machine may be carried laterally about one of the front wheels as a center. For effecting this operation, a driving pinion 164 is keyed to the shaft 122, and a gear wheel 165 (Figures 12 and 13) is secured to one side of the wheel 3, and at the termination of the swinging movement of the latter is brought into a position opposite the pinion 164, as shown in Figure 12, and in dotted lines in Figure 2. A shaft 166 is mounted in bearings 167, above and parallel to the shaft 122. A yoke 168 is mounted on the rock shaft, and secured in proper relation thereto by means of a set screw 169 or the like. A pinion 170 is journaled between the arms of the yoke, and is adapted to be depressed into engagement with the pinion 164 and gear 165, as shown in full lines in Figure 13, so as to complete the driving connecting between the engine and the wheel 3. For effecting this engagement, a pedal 171 is secured to the shaft 166 by means of a set screw 172 or the like, and extends within reach of the driver. The pedal is normally held in its uppermost position by means of a spring 173.

A device has been provided for manually releasing the trip arm 160 when it is desired to swing the rear wheel 3 back to normal position. This device includes a lever 174 (Figures 11, 14 and 15) which is intermediately pivoted, as at 175, with its rear end projecting behind the trip arm. A cable 176 is attached to the front end of the lever and extends within reach of the driver, so that by pulling upon the cable the lower end of the trip arm may be swung outwardly, as indicated in dotted lines in Figures 14 and 15, to clear the abutment 163 and permit the clutch teeth 154 to again engage the teeth 153. When this engagement has been effected, the clutch 141 having been previously reversed, the worm 121 will be driven in the opposite direction to restore the wheel 3 to its normal position.

In the normal operation of the machine, the bull wheel 26 is driven through the medium of the roller gear 48 and the gears 45, 43 and 42, the latter being operatively connected to the crank shaft of the engine by means of the reversing clutch $42^a$, so that the machine may be driven either forwardly or backwardly. The reversing clutch is controlled by means of a lever 177, which is pivotally mounted at its rear end to a bar 178, rigidly connected to the engine casing. The free end of the lever 177 is connected by a link 179 (Figures 2, 3, 4 and 5) to a bell crank 180 fulcrumed on the main frame bar 4, and having its other arm connected by a rod 181 to a hand lever 182 near the driver's seat. The pivotal connection between the bell crank 180 and the link 179 is normally in alinement with the pivot bolt 10, so that the position of the clutch $42^a$ is not affected by the swinging movement of the engine in steering.

As heretofore explained, the draw bars 71 are permitted by the springs 79 to yield, to a certain extent, when the plows encounter an unusual obstruction. In case the obstruction proves to be impassable, provision is made for disconnecting the clutch $42^a$ in order to prevent injury to the machine. This result is effected by means of chains 183 which connect the respective plow beams 69 to the rod 181, and as the draw bars 71 and bell cranks 75 approach the limit of their rearward movement, the chains pull the rod 181 rearwardly a sufficient distance to throw the clutch $42^a$ into neutral position.

From the foregoing description, it will be understood that the traction or bull wheel 26 may be driven directly from the engine either forwardly or backwardly, the connection being made through the reversing clutch $42^a$, which is controlled by the hand lever 182. The machine is normally steered by means of the steering wheel 55, which, through the gears 57, 58 and 62, operates to swing the engine in either direction about the pivot bolt 10 as a center. The bull wheel 26 being journaled on the trunnion 24, which is an integral part of the engine frame, swings with the engine and maintains its operative connection therewith. The land side wheel 36 is always maintained in parallelism with the bull wheel by means of the rod 38. At times, however, it is desirable to adjust the rear end of the machine laterally without moving the machine longitudinally. This is particulary desirable when turning corners. In order to effect this movement, the clutch $42^a$ is thrown into neutral position, and the clutch 141 is shifted into engagement with one or the other of the gears 135, 136 by means of the hand lever 152. The clutch teeth 153 and 154 being normally in engagement, the worm 121 is rotated to swing the wheel 3 laterally until the trip arm 160 engages one of the abutments 163, and disconnects the clutch 155.

The pedal 171 is then depressed, so that the gear 170 connects the gears 164 and 165, and the wheel 3 is rotated until the rear end of the machine reaches the desired position, whereupon the pedal 171 is released. During this movement, the wheel 3 travels about either the bull wheel 26, or the land side wheel 36 as a center. In order to restore the wheel 3 to its normal position for forward travel, the clutch 141 is first reversed, and then the cable 176 is pulled to release the trip arm 160, whereupon the clutch 155 is released, and the worm 121 is driven to swing the rack 119 and the wheel 3 back to normal position.

The plows may be readily raised or lowered by the manipulation of the levers 87, and the land side wheel 36 may be adjusted vertically by means of the bolt 30 to correspond with the depth of the plows. When traveling over the road, the axle 35 of the land side wheel is swung into the position shown in full lines in Figure 19, so that the plows will be carried above the ground.

It is important that a machine of this kind be built as light as possible, not only to make it less expensive and easier to operate but also to prevent packing of the soil especially when the latter is moist. At the same time there must be sufficient traction to pull the plows. The distance between the outer edges of the rims 100 is therefore somewhat less than the width of the furrow, and the blades at the ends of the lugs 99 extend far enough so that they will cut into both sides of the furrow, thus increasing the traction. The resistance in connection with the driving of the colter disks and trash feeders will further increase the traction so that the maximum of traction is obtained with the least possible weight.

A harrow 184 may be attached to the rear end of the main frame and drawn thereby so as to harrow the ground at the same time that it is plowed.

While the machine in the embodiment herein shown and described is used for plowing, it is obvious that many of the important features of the invention may be used in other relations, and in connection with other types of implements. Many modifications may be made also in the construction of the mechanism by which the various operations are effected, without departing from salient features of the invention as expressed in the claims.

What is claimed is:

1. In a tractor implement, the combination of a main frame, an engine pivotally mounted to swing about a vertical axis located on the front portion of said frame at one side thereof, a traction wheel journaled on the engine frame and driven from said engine, said traction wheel being in substantially the same vertical plane as the axis about which the engine swings, a wheel supporting the opposite side of said engine and main frame, and a wheeled support for the rear end of the frame.

2. In a tractor implement, the combination of a main frame, an engine pivotally connected to said frame to swing about a vertical axis thereon, a roller carried by said engine at a distance from its axis, an arcuate track secured to the main frame on which the roller rides as the engine is swung about its axis, a traction wheel journaled on the engine frame at one side thereof and driven from said engine, a wheel supporting the opposite side of said main frame, and means for maintaining said wheels in parallelism.

3. In a tractor implement, the combination of a main frame, an engine and a traction wheel operatively connected together and pivotally mounted to swing as a unit about a vertical axis at one side of the main frame, a land side wheel mounted to swing about a vertical axis at the other side of the main frame and supporting the same, and means for maintaining a parallel relation between the two wheels.

4. In a tractor implement, the combination of a main frame, including a central longitudinal beam with a transverse bar secured to its forward end and terminating at its ends in forwardly projecting arms, a land side wheel in supporting relation to one of said arms and pivoted to swing about a vertical axis thereon, an engine pivoted at one side to swing about a vertical axis on the other arm and supported at the other side to ride on said main frame, a bull wheel journaled on said engine at the side opposite the land side wheel, means for maintaining the bull wheel and land side wheel in parallel relation, and means for supporting the rear end of the main frame.

5. In a tractor implement, the combination of a main frame, an engine and bull wheel at the front end of said frame and mounted to swing as a unit about a vertical axis with respect thereto, a land side wheel at the front end of the frame, means for swinging the land side wheel in parallel relation to the bull wheel, a horiontal ring secured to the rear end of the main frame, a second ring slidable circumferentially of the first mentioned ring and in supporting relation thereto, and a rear ground wheel journaled in and supporting said second ring.

6. In a tractor implement, the combination of a main frame, a wheel supporting one side of the front portion of the frame and mounted to swing about a vertical pivot, an engine mounted to swing about a vertical pivot at the other side of the front portion of the main frame and riding on said frame as it swings, a traction wheel journaled on the engine frame with its center directly above the pivotal connection between the engine frame and main frame, a driving connection between the engine and the traction wheel, and means for maintaining said wheels in parallelism.

7. In a tractor implement, the combination of a main frame having two front supporting wheels located at opposite sides thereof and one rear supporting wheel, an engine mounted on said frame and operable to drive one of the front wheels, means for swinging said engine and driven wheel as a unit with respect to the main frame about a vertical axis which passes substantially through the center of the driven wheel, and means for simultaneously swinging the other front wheel about a parallel axis so as to maintain it in parallel relation to the driven wheel.

8. In a tractor implement, the combination of a main frame having two front supporting wheels located at opposite sides thereof and one rear supporting wheel, an engine mounted on said frame and operable to drive one of the front wheels, means for swinging said engine and driven wheel as a unit with respect to the main frame about a vertical axis which passes substantially through the center of the driven wheel, means for simultaneously swinging the other front wheel about a parallel axis so as to maintain it in parallel relation to the driven wheel, and means selectively operable by the engine to turn the rear supporting wheel about a vertical axis.

9. In a tractor implement, the combination of a main frame, a wheeled support at the rear end of the frame, an engine and traction wheel at the front end of the main frame, said traction wheel having an internal gear, a roller gear driven from the engine and in mesh with said internal gear, said engine and traction wheel being mounted to swing as a unit on the main frame about a vertical axis which passes substantially through the center of the traction wheel, a front supporting wheel at the side opposite the traction wheel and mounted to swing about an axis parallel to the axis of the engine and traction wheel, and means for maintaining the parallel relation between the traction wheel and other front supporting wheel.

10. In a tractor implement, the combination of a main frame having supporting and steering wheels at its front end said wheels being mounted to swing in said frame about parallel vertical axes, means for always maintaining said wheels in parallel relation to each other, an engine in driving relation to one of said front wheels and mounted to swing as a unit therewith, a horizontally disposed ring secured to the rear end of the main frame and having an annular channel in its under face, a second ring mounted for circumferential sliding movement in said channel, and a rear supporting wheel having an axle in supporting relation to the second ring.

11. In a tractor implement, the combination of a main frame having supporting and steering wheels at the front end said wheels being mounted to swing in said frame about parallel vertical axes, means for always maintaining said wheels in parallel relation to each other, an engine in driving relation to one of the front wheels and mounted to swing as a unit therewith, a horizontally disposed ring secured to the rear end of the main frame and having an annular channel in its under side, a second ring mounted for circumferential sliding movement in said channel, a rear supporting wheel having an axle in supporting relation to the second ring, and gearing selectively driven from the engine for moving the second ring circumferentially to swing the rear supporting wheel about a vertical axis.

12. In a tractor implement, the combination of a main frame having supporting and steering wheels at its front end, said wheels being mounted to swing in said frame about parallel vertical axes, means for always maintaining said wheels in parallel relation to each other, an engine in driving relation to one of said wheels and mounted to swing as a unit therewith, a horizontally disposed ring secured to the rear end of the frame and having an annular channel in its under side, a second ring mounted for circumferential sliding movement in said channel, a rear supporting wheel having an axle in supporting relation to the second ring and normally perpendicular to the line of travel, gearing selectively driven from the engine for moving the second ring circumferentially to swing the rear supporting wheel about a vertical axis, means for automatically disconnecting said second ring from the engine when the rear wheel has been swung in a predetermined plane transverse to the line of travel, and means for driving said rear wheel from the engine when in that position.

13. In a tractor implement, the combination of a main frame having supporting and steering wheels at its front end, said wheels being mounted to swing in said frame about parallel vertical axes, means for always maintaining said wheels in parallel relation to each other, an engine in driving relation to one of said wheels and mounted to swing horizontally therewith, a third wheel in supporting relation to the rear end of the frame and normally disposed in a longitudinal plane but mounted to swing laterally about a vertical axis, gearing selectively driven from the engine for swinging the rear wheel about said vertical axis, means for automatically disconnecting said gearing from the engine when the rear wheel has been swung into a predetermined plane transverse to the line of travel, and means for driving said rear wheel from the engine when in that position.

14. In a tractor implement, the combination of a main frame, an engine pivotally mounted to swing on the front portion of said frame about a vertical axis, a traction wheel journaled on the engine frame at one side thereof and concentric with the crank shaft of the engine, means for driving the traction wheel from the crank shaft of the engine, a wheel supporting the opposite side of the engine and main frame, and a wheeled support for the rear end of the frame.

15. In a tractor implement, the combination of a main frame, an engine pivotally mounted to swing on the front portion of said frame about a vertical axis, wheels supporting said main frame and engine including a traction wheel journaled on the engine frame at one side thereof and having an operative connection with the engine, a clutch controlling the connection, a lever fulcrumed on the frame, and means including a link connecting the lever to the clutch for actuating the latter, the point of connection between said means and the lever being vertically above the center of oscillation of the engine, so that its operation will not be affected by a change in the position of the engine.

16. In a tractor implement, the combination of a main frame having two front supporting wheels and one rear supporting wheel, an engine mounted on said frame and having an operative connection with one of said wheels for driving the same, means for swinging said engine and driven wheel as a unit about a vertical axis with respect to the main frame, a clutch controlling the connection between the engine and driven wheel, a lever fulcrumed on the frame, means including a link connecting the lever to the clutch for actuating the latter, the point of connection between said means and the lever being vertically above the center of oscillation of said engine and driven wheel, so that its operation will not be affected by a change in the position of the engine, and means selectively operable by the engine to turn the rear supporting wheel about a vertical axis.

17. In a tractor implement, the combination of an engine frame having a crank shaft disposed transversely thereof, a projection at one side of the engine frame forming an axle, a traction wheel journaled on said axle, a driving connection between the crank shaft and traction wheel, a main frame on which the engine rests, a wheel supporting said main frame at the side opposite to the traction wheel, a vertical pivot connecting the main frame to the engine frame on the same side as the traction wheel, permitting the engine frame and traction wheel to be swung laterally as a unit, and means for maintaining the two wheels parallel.

In testimony, that I claim the foregoing as my own, I have hereto affixed my signature.

MARTIN R. BRUNER.